Patented Dec. 20, 1938

2,140,863

UNITED STATES PATENT OFFICE 2,140,863

PROCESS FOR PRODUCING A PURE WHITE CELLULOSE

Erik Bror Fredrik Sunesson, Skoghall, Sweden, assignor to Uddeholms Aktiebolag, Uddeholm, Sweden No Drawing. Application January 23, 1934, Serial No. 708,001. In Sweden January 23, 1933

1 Claim. (Cl. 8—105)

As is known, it is not possible to produce, according to the existing methods, from sodium cellulose or sulphate cellulose a product having a pure white color and possessing the properties which are particularly important for further use, such as strength, high viscosity and the like. Either the strength of the cellulose is reduced, or the cellulose has very good strength properties, but is of dark color and cannot be bleached beyond a certain limit by subsequent treatment without employing measures, such as high temperatures, which destroy the good strength properties.

It has been found that this objection can be overcome and that a pure white, valuable product from cellulose obtained by alkaline decomposition, retaining all valuable properties of the unbleached cellulose can be produced by employing the process hereinafter described.

The process consists in carrying out the bleaching procedure in stages. In the first stage the unbleached cellulose is treated with an oxidizing bleaching agent, for example so much chloride of lime is added that up to 60% of the lignine oxidizes. The cellulose is not attacked, whereas the compounds in the cellulose are destroyed which, during the subsequent chlorination would form dark chlorinating products which are difficult to bleach. The products obtained from bleaching are eliminated in a suitable manner for example by treatment with weak alkali and washing with water.

In the next stage chlorinating bleaching agents, such as chlorine water are added. Thus the greater part of the lignine still present is converted into chloro-lignine soluble in alkali. The cellulose is likewise not attacked by this treatment. After the separation of the chloro-lignine by weak alkali and washing out with water, a cellulose of excellent strength and practically free from lignine is obtained.

In the third stage the cellulose is bleached by treating with a small quantity of an oxidizing bleaching agent, such as chloride of lime. In this instance the valuable fibre properties are also not affected.

It has further been ascertained that during the first bleaching stage room temperature or a slightly higher temperature is suitable. The chlorination is preferably carried out at room temperature or at a slightly lower temperature. For the third bleaching stage it is advantageous to work at higher temperatures about 30–40° C., for accelerating the reaction.

The cellulose obtained according to the invention can be treated in known manner with an acid, for example strongly diluted hydrochloric acid, or with alkali up to the mercerizing strength, according to the purpose of use.

Example 1000 kgs. of unbleached cellulose, produced according to an alkaline decomposing method, are treated at room temperature with a quantity of chloride of lime which corresponds to 50 kgs. of bleaching chlorine. When the chloride of lime is used up, which happens after about one hour, the cellulose is washed and chlorinated with 30 kgs. of chlorine, for example in the form of chlorine water, at 15–20° C. during about 2 hours. When the chlorine is used up, the resultant chloro-lignine is detached with caustic soda, and the cellulose washed with water. After these two bleaching stages the cellulose is practically free from lignine, of light grey color and possesses all the strength properties of the unbleached cellulose. In order to bleach it perfectly white, a treatment follows with a quantity of chloride of lime corresponding to 15 kgs. of bleaching chlorine. This final bleaching operation is preferably carried out at increased temperature, about 30° C., and lasts about 5 hours. After the bleaching the cellulose is thoroughly washed with water. The cellulose obtained is of pure white color and possesses excellent strength properties.

I claim:

A process for producing a pure white cellulose with properties particularly valuable for subsequent use, consisting in subjecting unbleached cellulose obtained by alkaline decomposition to a bleaching in stages, in employing hypochlorite in the first stage, chlorine water in the second stage, and hypochlorite in the third stage, so much hypochlorite being added in the first oxidizing bleaching stage that up to 60% of the lignine oxidizes, in detaching by means of caustic soda the chloro-lignine soluble in alkali after the second stage, and in washing the pulp with water after every bleaching stage.

ERIK BROR FREDRIK SUNESSON.